Feb. 1, 1966     C. R. WARD     3,232,733
APPARATUS FOR DRAWING GLASS

Filed Feb. 28, 1962     3 Sheets-Sheet 1

INVENTOR.
CECIL R. WARD
BY Oscar H. Spencer
ATTORNEY

Feb. 1, 1966 C. R. WARD 3,232,733
APPARATUS FOR DRAWING GLASS
Filed Feb. 28, 1962 3 Sheets-Sheet 2

INVENTOR.
CECIL R. WARD
BY
Oscar L. Spencer
ATTORNEY

Feb. 1, 1966 C. R. WARD 3,232,733
APPARATUS FOR DRAWING GLASS
Filed Feb. 28, 1962 3 Sheets-Sheet 3

INVENTOR.
CECIL R. WARD
BY
Oscar L Spencer
ATTORNEY

United States Patent Office 3,232,733
Patented Feb. 1, 1966

3,232,733
APPARATUS FOR DRAWING GLASS
Cecil R. Ward, Gibsonia, Pa., assignor to Pittsburgh Plate Glass Company, Pittsburgh, Pa., a corporation of Pennsylvania
Filed Feb. 28, 1962, Ser. No. 176,394
5 Claims. (Cl. 65—193)

This application relates to the production of sheet glass in which a continuous ribbon of glass is drawn from a bath of molten glass through a cooled drawing chamber, and more specifically to the production of sheet glass of improved quality and appearance.

Sheet glass, also known as window glass, is produced by drawing a continuous ribbon of glass from a bath of molten glass through a cooled drawing chamber. This expression is true for any of the three well known processes, i.e., the Pennvernon or Pittsburgh process, the Fourcault process and the Colburn process. In the first and second named processes, the ribbon is drawn vertically and is capped or cut into bulk sheets of glass several floors or levels above the molten glass bath and the drawing chamber. Rolls frictionally engaging the opposed surfaces of the glass provide the tractive force for drawing the glass.

In the Colburn process, the ribbon is drawn vertically for a short distance, is then directed over a large diameter roll and withdrawn thereafter in a horizontal direction. The frictional drag of supporting rolls for the glass provide the tractive force for drawing the glass. The Pennvernon or Pittsburgh process differs from the Fourcault process in that a draw bar submerged in the glass bath defines the plane of the draw and stabilizes the sheet as compared with the use of a partially submerged debiteuse through which the sheet is extruded. Also, the drawing chamber in the Pennvernon or Pittsburgh process is partially defined by clay shapes known as L-blocks whose lips are spaced from the bath of molten glass, and a submerged shut-off block, a clay shape, partly defines the volume of glass from which the glass is drawn. In the Fourcault process the drawing chamber is defined in part by a clay shape partially submerged within the molten bath similar to the mentioned shut-off block. In the Pennvernon or Pittsburgh process and the Fourcault process, the bath depth is the same as the depth of the glass within the melting furnace and no heat is applied to the glass in the bath. However, the glass in the bath at the surface in the Pittsburgh process is always fluid while the glass at the surface outside the confines of the debiteuse in the Fourcault process cools and freezes. In the Colburn process the depth of glass in the drawing bay is less than that in the melting tank and heat is applied thereto. The sheet is drawn from a free surface without the aid of clay shapes in the Colburn process and the drawing chamber is partly defined by jack arches having components of horizontal length.

In all the above described processes there is a cooled drawing chamber, i.e., a chamber through which the glass is drawn and in which there are coolers for absorbing radiant energy from the sheet, so as to dimensionally set the sheet into its desired width and thickness, the latter being determined at least in part by the speed at which the sheet is drawn by the traction means. In any of the drawing chambers there are air currents present because of the geometry of the drawing chamber and conditions within the drawing chamber. Because the ribbon does not become dimensionally stable for a distance above the bath, some of these air currents influence the formation of the sheet, as will be hereinafter explained, and prevent the formation of a perfect ribbon of glass.

In any known sheet glass drawing chamber there is a natural stack which flows along the sheet in the direction of the draw and exhausts from the chamber at its top. Air enters the drawing chamber at its top and through any cracks or crevices and flows along the walls of the drawing chamber to the base of the sheet and into the stack. Of course, the air entering the chamber is at a temperature less than the ambient within the chamber and becomes further chilled in its path along the walls which are cooler than the ambient interior temperature. The air becomes heated as it passes over the bath and at the base of the sheet and enters and rises in the stack. Air within the chamber is also chilled by contact with the coolers within the chamber and cascades downwardly along their faces and flows toward the base of the sheet. There are currents of air flowing downwardly along the side walls of the chamber which are known as "end-around currents."

The currents of air flowing toward the base of the sheet and into the stack are not uniform either in temperature or in velocity, and strike the glass ribbon in an area of critical formation where the glass is at such a viscosity that it is being attenuated by the tractive force applied thereto. The air currents cause non-uniformities in temperatures transversely of the ribbon with a resultant non-uniformity in attenuation. Pattern, i.e., variations in thickness across the ribbon, is the result. Pattern manifests itself as a ribbed effect with perhaps a superposition of one ribbed effect angularly over another, commonly known as "batter." The ribs appear to be endless and run generally in the direction of the draw. Pattern affects the optical qualities of the product and precludes its use for some purposes, such as top grade mirrors, automobile windshields, i.e., where the highest degree of optical perfection is required.

Many attempts have been made to improve the quality of drawn sheet glass. Many of these attempts have been at least partially successful in that they have reduced the amplitude of the pattern thickness variations and have decreased their frequency, i.e., they have made the ribs appear to be wide as compared with the prior narrow ribs. Perfecting the optical quality of the ribbon has resulted in an increased quantity of sheet glass being used for mirror production.

Examples of arrangements usable for improving the quality of sheet glass can be found in the United States Letters Patent to Brichard No. 2,693,052, granted November 2, 1954, and entitled, "Process and Apparatus for Drawing Glass," and the copending application for United States Letters Patent of Robert A. James and Cecil R. Ward, Serial No. 771,393, filed November 3, 1958, and entitled "Manufacture of Glass," now Patent No. 3,097,942.

In the identified patent and application, gaseous current injecting means in the form of burners are employed to control the flow of air in the sheet glass drawing chamber. The intensity of the gaseous currents injected into the drawing chamber are substantially the same from side to side of the drawing chamber. In the Brichard patent, gaseous currents are injected upwardly in the drawing chamber from a location just above the bath surface to either eliminate the stack along the ribbon or reverse the direction of flow of air along the ribbon. The application of James and Ward injects gaseous currents generally upwardly within a drawing chamber to reduce the quantity of air in the stack and also reduce the temperature and velocity differences of the air flowing to the stack. Cyclic currents of air are established in zones of the chamber removed from the ribbon.

While the attempts noted above materially improve the quality of the glass product, the product is not the ultimate quality glass which can be produced by the drawing process. The ultimate quality glass which can be produced by the described sheet glass process will have a uniform thickness with its major surfaces plane and parallel to one another. This product, in addition to having a fire polished surface naturally obtainable because of the nature of the process can be used in any application where the highest optical requirements are needed.

It has been found that the quality of the glass product may be further improved over the previous attempts enumerated above, by forming and directing a plurality of streams of gas from a plurality of locations across the ribbon and in a generally upwardly direction with the intensity of flow initially in one area being different than the intensity of flow initially in another area spaced laterally from the first area. In other words, the quantity and velocity of the formed gaseous flow initially in one area will be different from that in another, laterally spaced area. By following this procedure it is possible to compensate for factors which cause a variance in flow of air currents from side to side within the drawing chamber. Observation of air currents will show that the intensity of the natural flow of gases in laterally spaced areas with respect to the sheet vary from one side of the chamber to the other side of the chamber. Generally, the differences in flow manifests itself in the central third of the drawing chamber, i.e., the intensity of flow of gases to control the air currents within the drawing chamber in the central third thereof should be greater than that in the remainder.

To accomplish the desired control of air currents within the drawing chamber, according to the present invention, the use of blowers or fans to direct the currents as desired is contemplated.

Fans or blowers include electric motors whose rotational speeds are controllable within wide limit for controlling air flow intensity also offer numerous other advantages when compared with the gaseous injection devices of the aforementioned patent and application. Such advantages will be fully described hereinafter.

To further explain the invention being herein described, attention is directed to the appended drawings in which like reference characters are used to refer to like parts and in which.

Figure 1:
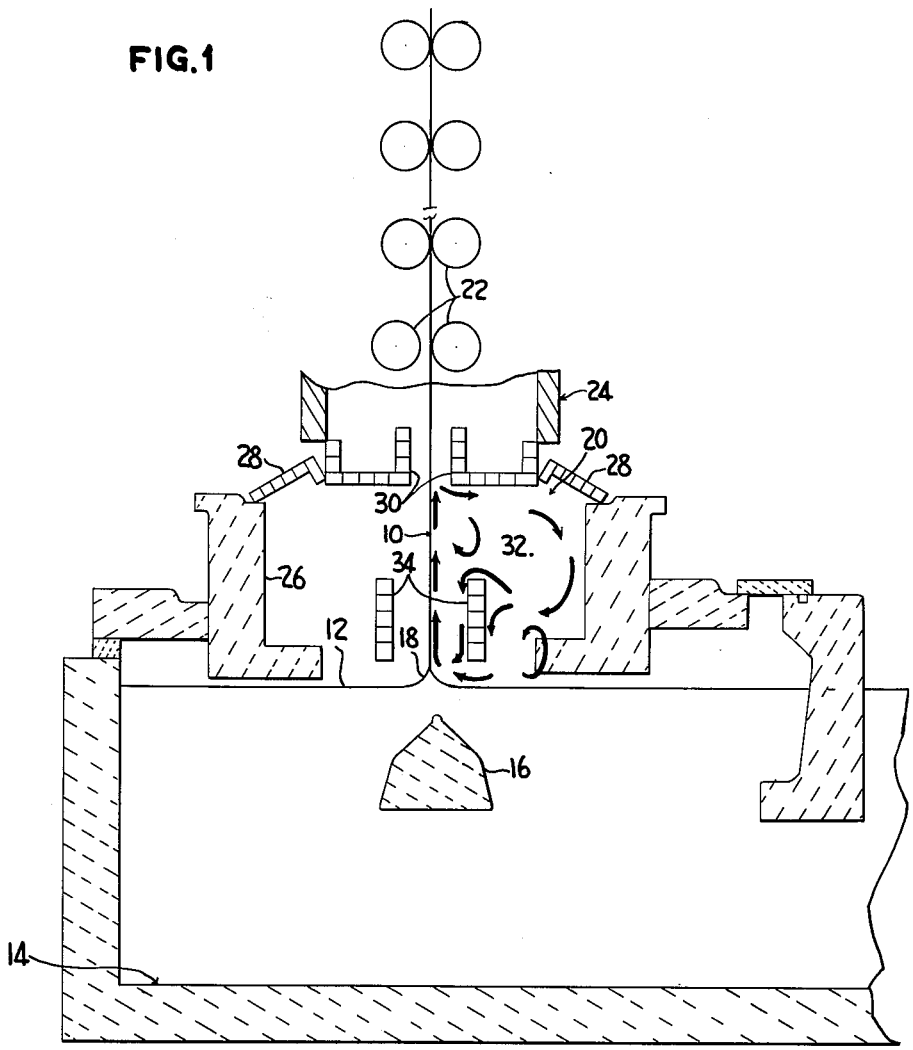
FIG. 1 is a schematic drawing of a conventional Pennvernon or Pittsburgh window glass drawing arrangement showing the bath of glass, the cooled drawing chamber, a portion of the apparatus for applying tractive force to the ribbon of glass and also indicating the normal air current flow in the drawing chamber.

Attention is directed now to FIG. 1 which shows a ribbon of glass 10 being drawn from a bath of molten glass 12 contained in a drawing bay 14 of a glass making furnace. A clay shape known as a draw-bar and identified as 16 is submerged within the bath 12 and stabilizes the sheet and defines the plane of the draw. The ribbon 10 forms a base or meniscus 18 with the bath and is drawn through a cooled drawing chamber, generally identified as 20, by means of pairs of rolls 22 of a drawing machine 24. One roll of each pair of rolls 22 is a fixed roll and the other roll is a swing roll that can be removed from contact with the ribbon of glass.

The drawing chamber 20 is defined by the bath of glass 12, refractory L-blocks 26, ventilator coolers 28, catch pan coolers 30, and side or end walls 32. The ventilator coolers 28 and the catch pan coolers 30 are each constructed for the passage of cooling water therethrough. The catch pan coolers serve to catch any chips of glass which fall downwardly through the drawing machine 24 and prevent the entry thereof into the drawing chamber and into the bath of glass 12.

Between the ribbon of glass and the L-blocks are disposed coolers, known as machine coolers and identified as 34 through which water is passed for absorbing radiant energy from the ribbon of glass 10. The machine coolers 34 extend transversely of the drawing chamber 20 and are substantially the width of the ribbon 10 being drawn.

The structure above described is conventional for all Pennvernon or Pittsburgh window glass drawing apparatus. In the figure just described and in the figures to be described wherein the entire drawing apparatus is at least schematically illustrated, the air currents are indicated by arrows. The dark solid lines indicate high velocity air currents, the light solid lines indicate air currents of lesser velocity, and the broken lines indicate low velocity air currents.

Figure 2:
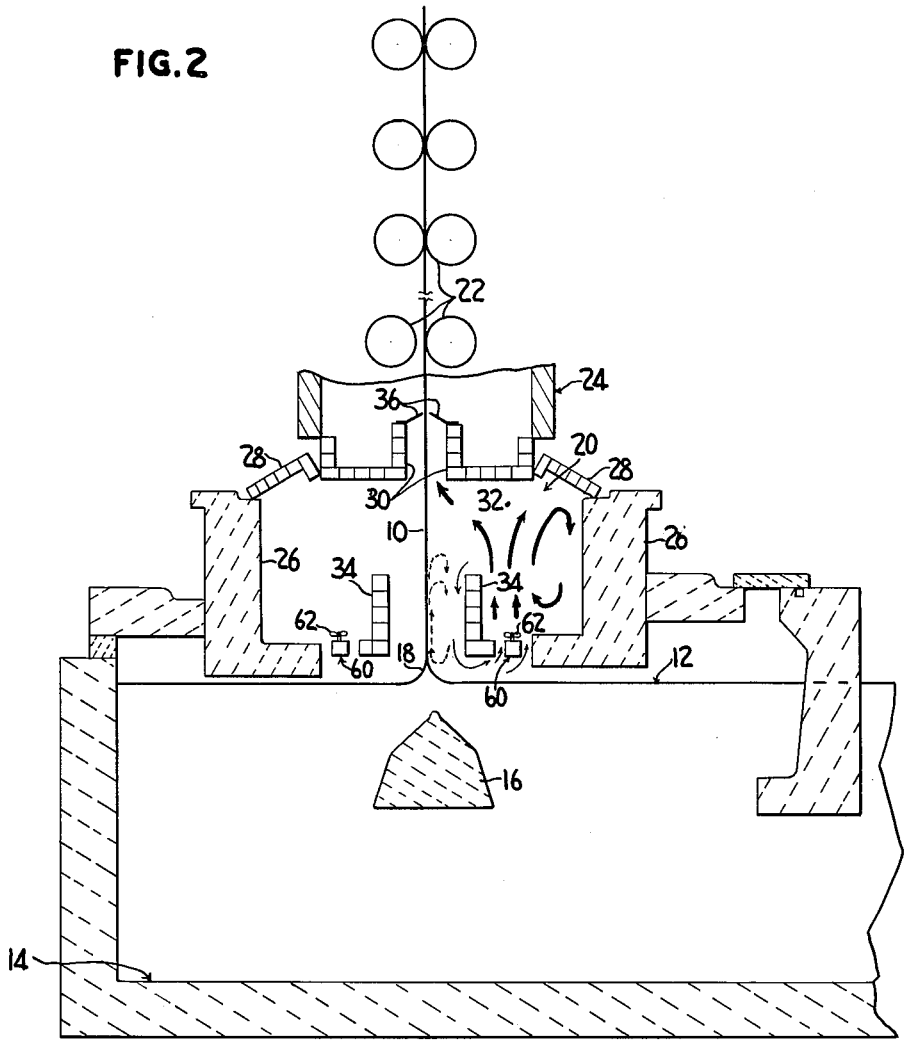
FIG. 2 is a schematic drawing of a Pennvernon or Pittsburgh window glass drawing arrangement similar to that illustrated in FIG. 1 with the addition of air current control means according to the present invention and indicating the controlled air current flow in the drawing chamber.

Attention is directed to FIG. 2 which shows a Pittsburgh or Pennvernon window glass drawing arrangement having the same arrangement of parts and identified in the same manner as the conventional arrangement described above.

Additionally, there are catch pan dampers 36, such as described in the James and Ward application serving to restrict the opening between the drawing chamber and the drawing machine.

Air control means which comprises a series of fans or blowers 60 are arranged in side-by-side relationship from one side of the drawing chamber to the other side of the drawing chamber. Each fan or blower includes a bladed member 62 connected to the shaft of an electric motor 64 in turn connected to a suitable source of electrical power. The blades 62 are contiguous from side-to-side of the drawing chamber. Rheostats 65 of known construction are interposed between the source of power and the motors, so that the amount of current to the motor may be controlled and thus the rotational speed of the bladed members may be controlled. This provides a control for the air currents within the drawing chamber.

Each motor 64 may be controlled individually, i.e., a rheostat 65 may be positioned between each motor and its source of power. However, as previously stated, the differences in air current flow generally manifests itself in the central third of the drawing kiln when viewed from side wall to side wall and across the ribbon of glass being formed. For that reason, it is possible to construct the assembly of fans in sections, each section of which includes a plurality of motors 64 connected to operate in unison. Generally, three equal sections are used. This arrangement permits the use of one rheostat for the plurality of motors in a section. Control of air currents using the sectioned assembly is quite satisfactory. The intensity of the force applied to the air in the chamber is thus capable of being varied in incremental areas or zones across the drawing chamber, so that the intensity of the formed streams of air in one zone initially can be and usually are different from that in another, laterally spaced zone. It is possible that each formed stream of air will initially be different in intensity than the intensity of every other formed stream of air. Each of the motors 64 is insulated to withstand the heat encountered and is received within a water cooled member 66 so that the temperatures encountered within the drawing chamber do not affect their operation. The water-cooled member 66 can be a hollow sheet metal structure having brackets 68 attached thereto to support a motor 64. Cooling water is fed to one end of the member 66 and is discharged from its other end by pipes 70. The member 66 and the pipes 70 which pass through the end walls 32 of the drawing chamber 20 support the array of blowers or fans 60 in their desired location within the drawing chamber. As illustrated, the blower or fan arrangement is preferably placed between the L-blocks and the machine coolers and away from the sheet. With this arrangement, the resulttant air currents within the drawing chamber are illustrated by using the aforementioned code of different types of lines.

Figure 3:
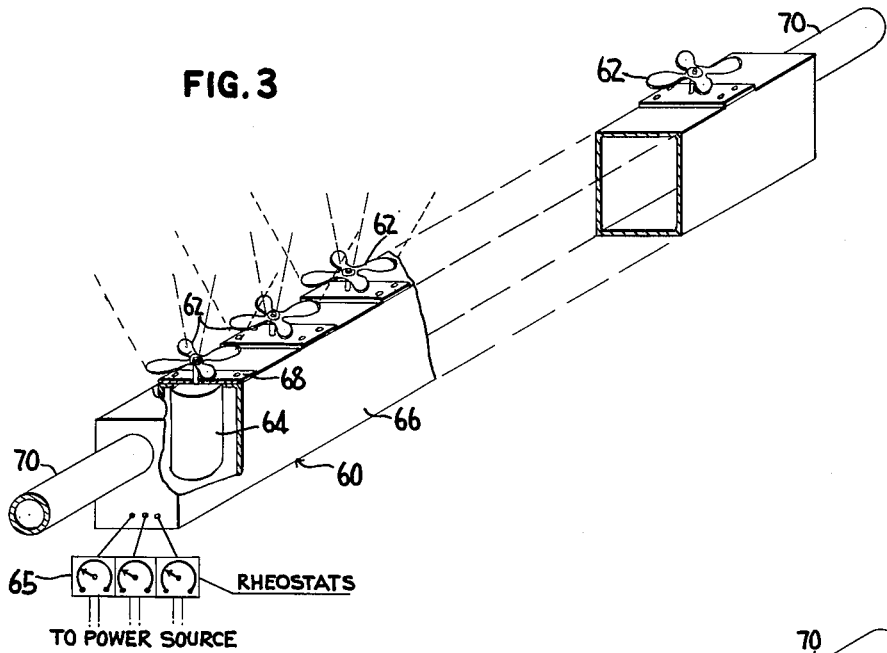
FIG. 3 is an isometric of a fan blower arrangement for air current control and usable in the embodiment illustrated in FIG. 2.
Figure 4:
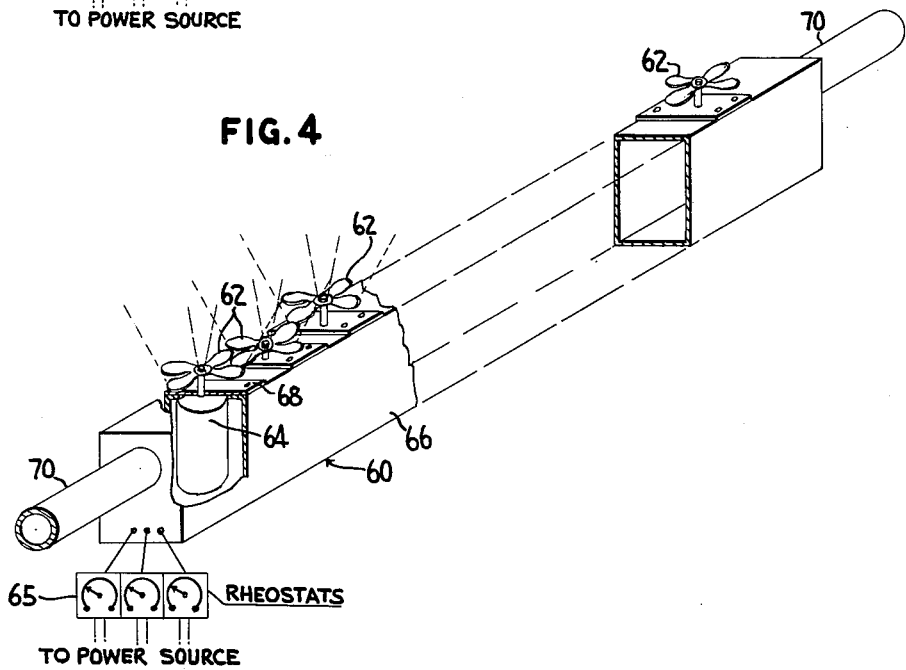
FIG. 4 is an illustration similar to FIG. 3 and showing a modification of the fan arrangement.

Each fan influences a funnel-shaped mass of gas as indicated in broken lines on FIGS. 3 and 4 with a void through its axis created by the shaft of the blade. Because a substantially continuous gaseous flow is desired, even though it may and probably will vary in portions to correct for conditions within the drawing chamber, the fans are preferably arranged to provide this continuous gaseous flow. This is accomplished, preferably, by mounting adjacent fan blades at different levels, so that the zones of influence cross and merge with one another and compensate for the void zones. This arrangement, illustrated in FIG. 4, also is advantageous in that each and every blade may rotate without interference from the next adjacent fan blade.

As a further modification, more than one of fans may be employed. Their zones of influence also would cross and overlap to insure complete control of the air currents in the drawing chamber.

It is desirous to control the normal air currents which flow as in FIG. 1 and cause them to flow as in FIG. 2. The air current control means of this invention because of the direction given to the air flow within the chamber establishes a cyclic path of air flow between the coolers 34 and the L-blocks, drawing air from the base of the sheet, from the coolers 34 and from along the L-blocks into this path, so that only a flow of air having controlled quantity and velocity flows with the sheet and forms the controlled stack. The control established is similar to but refined over that described in the aforementioned James and Ward application in that the intensity of flow in one part of the chamber is different from that in another part of the chamber to insure uniformity regardless of operating conditions of the various components.

Experience has shown that each and every sheet glass drawing kiln differs somewhat in operation, probably due to minor differences in dimensions, locations of cracks, crevices or the like, location relative to the glass melting tank, etc. Therefore, the exact fan or blower speed adjustment to give the particular desired initial air current flow requires individual consideration for each drawing kiln. The general arrangement, however, can be predicted and has been explained herein.

One manner in arriving at the correct adjustment is by observing the natural air currents within the drawing chamber. This may be accomplished by placing a smoke producing agent at various locations across the chamber and observing the flow of the smoke produced. This procedure permits the observer to compare, generally, the relative velocities of air currents across the drawing chamber to be considered in proper arrangement of the equipment made and used in accordance with this invention. Periodic observations, for example, every two hours, are made and corrections to fan section speeds are made in accordance with the observations by a skilled operator.

By way of further explanation, the air current control means of this invention is positioned relative to the natural air flow stream to the base of the sheet, so that the control air streams divert the natural flow streams. The control air streams should be of such character to form a uniform band of air streams extending substantially the width of the sheet and preferably the width of the drawing chamber.

By way of example, the electric motors 60 are fractional horsepower motors of relatively small dimensions. Mottors have been used that operate from a 440 volt A.C. power source and are approximately 1 inch in diameter and 1⅝ inches in length. On these motors, fan blade assemblies have been monuted. Each blade has been three inches in diameter and has incluuded four blades which were ¾ inch wide at the widest part. These blades were pitched about 10 degrees from the horizontal.

The described motors are capable of being operated from 0 r.p.m. up to 6,000 r.p.m.

Speeds of 2,000 r.p.m. to 4,000 r.p.m. using the above described blades have produced the best results when the assembly of fams has been located between the L-blocks and the machine coolers, as illustrated in FIG. 2, so as to direct the gases generally upwardly. Other speed ranges may produce equal or superior results with other locations of the fan assembly. Also, a change in pitch of the blades or a change in blade dimensions or both can change the operational characteristics of the system.

Air current control means such as being described has numerous advantages over the usual burners or air injection means in that no extraneous gaseous fluid is introduced into the drawing chamber. The only air being controlled is that in the drawing chamber. Burners supply additional heat to the already high temperature in the drawing chamber. The rate of sheet cooling is thus reduced and a speed penalty is incurred. Burners also radiate heat to the bath which upsets the desired temperature gradient of the glass from the bath to the sheet. Frequently, there is an incomplete combustion of the gases fed to the burners, so that the products of incomplete combustion collect on the glass sheet being formed and also on the drawing rolls. These products of incomplete combustion are somewhat oily in nature and cause scumming of the sheet and also of the rolls. Scum on the sheet is difficult to remove and causes glass of relatively good quality to be rejected for some uses.

In normal use even when there is complete combustion of the gaseous mixture, which is highly unlikely, the burners introduce $CO_2$ and $H_2O$ vapors into the drawing chamber. These vapors are not entirely transparent to infra-red radiation. A speed penalty is incurred because of a slow-down in the cooling of the sheet. In addition, water vapor in the products of combustion reacts with the oxidation products which naturally form on the sheet metal coolers and causes a very loose scaling condition. After a short period of time the scale falls from the coolers into the bath and affects materially the quality of the sheet, causing a loss of at least a portion of the sheet and an upset in the process.

It has been stated that the appearance of a glass sheet is improved by the use of the present invention. This improvement has been demonstrated by the use of a test. In this test a white screen is placed 25 feet from the light source comprising a 1000-watt bulb in an apertured box. A randomly selected full width sample of glass sheet is cut into 5 equal parts across its width and each sample is placed between the box and the screen with the directions of draw of the sheet horizontally disposed. Each sample part is first tilted to determine the area having the most pronounced wave pattern. The same is then placed parallel to the screen and moved slowly toward the screen which provides a slight up and down motion until the most pronounced wave shadow disappears. The distance from the screen to the sample part at this point of disappearance measured in inches is referred to as the disappearance reading. Thus, disappearance readings are taken of the glass sheet at spaced intervals across its width. Using the kiln arrangement of FIG. 1, the average disappearance reading of a sample of glass was between 7 and 8 inches, using the kiln arrangement as described in the aforementioned James and Ward application wherein burners and catch pan dampers are used, the average disappearance reading of a sample of glass was between 17 and 18 inches, and using the kiln arrangements with the devices of the present invention, the average disappearance reading of a sample of glass was 40+ inches. High disappearance readings, such as 30 inches and above, with the James and Ward invention, are indicative of glass of much improved appearance. However, because of the character of the described test, the resolution of such high readings is less precise than for lower readings. The higher average reading indicates a more uniformly formed glass than that previously produced.

The foregoing has been described with particular reference to a "Pennvernon" or Pittsburgh drawing apparatus. The invention is equally applicable to the other types of drawing apparatus described wherein the fans or blowers can be suitably positioned and operated to provide the air current control in accordance with the invention and result in improved quality sheet glass.

I claim:

1. Apparatus for drawing glass comprising a bath of molten glass, a drawing chamber, means for drawing glass as a ribbon from the bath through a plane of draw in the chamber, a plurality of laterally spaced gas stream generating means located in a lower region of said drawing chamber and extending across the chamber above the bath for directing lateral increments of gas upwardly within the chamber, and means for controlling at least one of said gas stream generating means on one side of the plane of draw to vary the initial intensity of the gas stream therefrom independently of the initial intensity of a gas stream from another of said air stream generating means on a same side of the plane of draw.

2. In apparatus for drawing sheet glass from a bath of molten glass through a plane of draw in a cooled drawing chamber defined in part by said bath in which there are gaseous currents which affect the appearance of the sheet being produced, the improvement comprising, a plurality of fans within a lower region of said drawing chamber for generating a plurality of streams of gas in a generally upward direction, said fans being arranged to extend laterally of the chamber coextensive with the sheet being produced and spaced from the plane of draw and from the bath, variable speed driving means for each fan, means for separately energizing some of said driving means on a same side of the plane of draw, and means for varying the speed of less than all of said driving means independently of the speed of the others on a same side of the plane of draw so that the initial intensity of flow of at least one stream of gas is different from that of another stream of gas on a same side of the plane of draw.

3. Apparatus as recited in claim 2 wherein an individual driving means is provided for each said fan.

4. Apparatus as recited in claim 2 wherein said driving means is an electrically-operated motor.

5. Apparatus as recited in claim 2 wherein said plurality of fans is divided into laterally arranged groups and the means to vary the speed of the drive means is so arranged to vary the speed of each drive means of a group in unison.

References Cited by the Examiner

UNITED STATES PATENTS

| | | | |
|---|---|---|---|
| 2,158,669 | 5/1939 | Amsler | 65—84 |
| 2,470,526 | 5/1949 | Sharp | 65—204 |
| 2,519,457 | 8/1950 | Halbach et al. | 65—84 |
| 2,608,798 | 9/1952 | Sharp | 65—84 |
| 2,693,052 | 11/1954 | Brichard | 65—84 |
| 2,960,800 | 11/1960 | Atkeson et al. | 65—203 |
| 2,963,820 | 12/1960 | Brichard | 65—204 X |

FOREIGN PATENTS 210,761  10/1957  Australia.

DONALL H. SYLVESTER, *Primary Examiner.*

UNITED STATES PATENT OFFICE
CERTIFICATE OF CORRECTION

Patent No 3,232,733                              February 1, 1966

Cecil R. Ward

It is hereby certified that error appears in the above numbered patent requiring correction and that the said Letters Patent should read as corrected below.

Column 7, line 22, for "air" read -- gas --.

Signed and sealed this 26th day of September 1967.

(SEAL)
Attest:

ERNEST W. SWIDER                                  EDWARD J. BRENNER
Attesting Officer                                              Commissioner of Patents